United States Patent [19]

Herrmann et al.

[11] Patent Number: 4,773,513
[45] Date of Patent: Sep. 27, 1988

[54] HYDRODYNAMIC WORKING CIRCUIT WITH DEVICE FOR REDUCING AIR CIRCULATION LOSSES

[75] Inventors: Berthold Herrmann, Gerstetten; Klaus Brosius, Heidenheim; Olaf Spitzer, Giengen; Rudolf Fetzer, Crailsheim, all of Fed. Rep. of Germany

[73] Assignee: J. M. Voith GmbH, Fed. Rep. of Germany

[21] Appl. No.: 944,841

[22] Filed: Dec. 19, 1986

[30] Foreign Application Priority Data

Dec. 21, 1985 [DE] Fed. Rep. of Germany ....... 3545660

[51] Int. Cl.⁴ ............................................. F16D 57/02
[52] U.S. Cl. ..................................... 188/296; 188/269; 188/274
[58] Field of Search ............... 188/290, 296, 274, 269, 188/301; 60/333, 337; 416/180

[56] References Cited

U.S. PATENT DOCUMENTS

| 2,428,005 | 9/1947 | Bennett | 188/269 |
| 2,672,954 | 3/1954 | Bennett | 188/274 |
| 3,072,222 | 1/1963 | Kugel et al. | 188/296 |
| 3,774,735 | 11/1973 | Hanke et al. | 188/296 |

FOREIGN PATENT DOCUMENTS

| 677160 | 6/1939 | Fed. Rep. of Germany . |
| 63941 | 9/1968 | Fed. Rep. of Germany . |
| 97934 | 5/1973 | Fed. Rep. of Germany . |
| 2238726 | 2/1974 | Fed. Rep. of Germany . |
| 3217465 | 11/1983 | Fed. Rep. of Germany . |
| 1342228 | 1/1974 | United Kingdom . |
| 1365670 | 9/1974 | United Kingdom . |
| 1380847 | 1/1975 | United Kingdom . |

Primary Examiner—Andres Kashnikow
Assistant Examiner—Mark T. Le
Attorney, Agent, or Firm—Ostrolenk, Faber, Gerb & Soffen

[57] ABSTRACT

For the reduction of capacity losses and heating in hydrodynamic working circuits, especially retarders, caused by undesired air circulation in emptied condition, it is suggested to introduce a certain quantity of a blocking medium into the working chamber. This blocking medium may be operating fluid, air, or a mixture of both, and can be introduced radially from the inside, from the outside, or from the center. It forms a blocking film by rotation of the bladed rotor wheel, which substantially prevents the circulation of air from one bladed wheel to the other.

20 Claims, 1 Drawing Sheet

4,773,513

HYDRODYNAMIC WORKING CIRCUIT WITH DEVICE FOR REDUCING AIR CIRCULATION LOSSES

BACKGROUND OF THE INVENTION

1. Field of the Invention

The invention relates to a hydrodynamic working circuit having at least two bladed wheels, and more particularly to a retarder having means effective in shut-off condition for avoiding losses due to an undesirable air flow or circulation in the working chamber of the working circuit, which in such shut-off condition is filled with air.

2. Related Art

In hydrodynamic brakes (retarders), capacity losses occur when the retarder is in emptied condition due to air circulation between the two blade rims, when there is a difference in rotational speed therebetween. From U.S. Pat. No. 3,072,222 (equivalent to DE-PS 11 44 317) it is known that a partition wall (similar to a camera diaphragm) may be inserted into the air gap between stator and rotor for providing a substantial reduction of these losses, by preventing such air circulation.

From U.K. Patent Specification 1,365,670 (equivalent to DE-PS 22 27 624) is known another arrangement in which resiliently slidable tappets are arranged on the blades of one bladed wheel, which, during operation of the fluid circuit, are pressed by the working medium out of the flow profile, and then dip into the working chamber after emptying, and thus form a hindrance to the flow of circulating air.

Furthermore, from U.K. Patent Specification 1,342,228 (equivalent to DE-PS 21 35 268) is known an arrangement wherein hinged flow hindrances are pressed out of the working chamber during operation of the fluid circuit, and after emptying close automatically in the external area of the working chamber. The evacuation of the working chamber, too, has been suggested (DE-PS 677 160, DD-PS 63 941).

A further system of interest is disclosed in DE-PS 97 934.

Thus, there are well-known means by which the power-consuming air ventilation in switched-off condition can be reduced. These solutions, however, require, for example in the case of DE-PS 11 44 317, a complicated automatic system in which, on emptying of the working chamber, the diaphragms are slid in, necessitating an expensive linkage and guiding of the diaphragm components as well as a separation of the blade rims so that the diaphragm components can be slid in contact-free. This reduces the braking capacity. In the case of the other documents mentioned above, flow hindrances are pressed out of the working chamber during operation only when the flow is sufficiently intensive, and thus capacity losses are to be expected at low speed.

From DE-OS 32 17 465, a system is known with which unacceptable heating of a hydrodynamic coupling in emptied condition is prevented. For this purpose a certain quantity of fluid is continuously introduced into the working chamber as coolant. In interaction with the enclosed air, a partial vacuum is generated. The coolant is intended to absorb the heat contained in the enclosed air and to exit again through valves at the periphery of the coupling. The aim is apparently to dissolve the air in the working chamber of the coupling in the coolant. For this purpose, however, the coolant must, when it has left the working chamber of the coupling, be returned to an open vessel at atmospheric pressure so that the air can escape from the coolant. The coolant must consequently be fed into the working chamber air-free. It is doubtful whether the coolant, under the conditions of a partial vacuum, is capable of absorbing air at all. It is, furthermore, necessary to make openings at the rotating bladed wheel ahead of the trailing edge of the blades so that the blade channels formed by the blades are open radially outward at these points.

This design of blades for a retarder is disadvantageous because it decisively reduces the braking torque that has developed. Furthermore, the supply of the working medium to a retarder is generally effected in a closed circuit which makes it impossible for air to escape from the working medium. Rather, a retarder is generally operated with a fluid-air mixture, with the working chamber of the retarder being subjected to overpressure, so that the air remains dissolved in the working medium and has no negative influence on the mode of operation of the retarder. A system as per DE-OS 32 17 465 is therefore not usable for a retarder.

SUMMARY OF THE INVENTION

Accordingly, a primary object of the invention is to avoid the disadvantages of these prior systems and to provide a retarder with which an even more substantial reduction in undesirable air circulation is achieved reliably and with the most simple means.

This problem may be solved by a hydrodynamic retarder having a system for reducing air circulation in emptied condition, wherein a small quantity, in comparison with the volume of the working chamber, of a flowable blocking medium is provided by a secondary circuit and passed through the working chamber for interrupting air circulation between the bladed wheels.

According to another aspect of the invention, in switched-off condition, i.e., emptied condition, a small quantity (in comparison with the filling quantity in operation) of a flowable blocking medium is introduced into the working circuit instead of the working medium.

The inventors have recognized that the defects of the above-mentioned well-known means for reducing air circulation are caused primarily by the circulation of air between the blade impellers being prevented only incompletely, and thus not sufficiently disturbed. This is probably because the end-face cross section between the adjacent blade rims is not closed over the entire area by the mechanical flow hindrances.

The invention solves the problem, in that a disturbance of the air circulation is created by a certain small quantity of a blocking medium, which is not sufficient for filling the working chamber, being continuously supplied and again discharged. The blocking medium is reliably supplied by an independent auxiliary circuit for the blocking medium with supply and discharge pipes. On entry of the blocking medium into the working chamber it is caught by the boundary layer clinging to the bladed rotating wheels and the co-rotating air flow and a thin disk-shaped layer of blocking medium is formed which prevents the air from establishing a power-consuming flow from one bladed wheel to the other. No further mechanical moving elements are required for this.

An important advantage of this embodiment consists in the especially simple design which achieves its objects without components subject to wear and without expensive controls, while at the same time ensuring reliable performance. Through the continuous circulation of the blocking medium into and out of the working chamber, a substantial dissipation is also achieved of the heat which still remains from the previous operating phase in the components of the working circuit, especially the retarder. This also prevents the working circuit from heating up in the operating pauses as hitherto by air ventilation.

According to further aspects of the invention, air or a mixture consisting essentially of fluid working medium and air can serve as a blocking medium, in which case the same working medium is preferably used, as that which serves to operate the fluid circuit.

Various advantageous embodiments and arrangements are possible for the mouth or nozzle means of the supply channel for the blocking medium. The supply channel can be equipped with one or more nozzles at the entry, which are arranged either in the radially internal hub area, at the radially external area, outside the working chamber, or close to the center, at the socalled core ring. It is also possible to arrange the nozzles so that substantially only the radially external area of the free cross-section between the bladed wheels is covered by a layer of blocking medium to disturb the circulation of the enclosed air. The nozzles can be arranged adjacent to a rotating component, e.g., a rotor or a stator or the casing. particularly advantageous is the direct injection of the blocking medium into the gap between the bladed wheels, and preferably from the exterior thereof.

The blocking medium can emerge either through the stator or the rotor, i.e., through openings arranged radially outwards or through the gap. The rotors can be surrounded by an annular channel or receiver which takes up the exiting blocking medium.

A secondary feature of the invention is related to causing circulation of the blocking medium by the energy of the flow in the working chamber itself, instead of by a circulation pump. The blocking medium is taken out of the working chamber through a discharge channel and, after being cooled, is fed in again by an inlet channel in a controlled way. Outside the retarder is arranged a tank, for example, a heat exchanger, which is filled with fluid up to a certain level. The air or the fluid-air mixture exiting from the working chamber is led over the surface of the fluid in the tank so that the certain quantity of fluid necessary to form a layer of blocking medium in the working circuit is entrained.

The invention is applicable not only to working circuits with two bladed wheels, e.g., hydrodynamic brakes or hydrodynamic couplings, but also to torque converters with at least three bladed elements, that is, a pump impeller, a turbine runner and a stator, especially when a torque converter is used temporarily for braking.

The invention offers particular advantages with a retarder whose bladed wheels rotate in opposite directions. In such a retarder it is expensive from a design point of view to install mechanically actuated orifice-type valves in the gap between the two bladed wheels without interfering with the braking effect. It is preferable for one of the rotating bladed wheels to be provided with openings for the entry of blocking medium into the working chamber. A further simplification accomplished by the invention is that the blocking medium can also flow in when the retarder is in operation. This eliminates special filling and emptying measures for no-load running. The supply and return pipes for the working medium can be independent of those of the blocking medium circuit.

Other objects, features and advantages of the invention will be seen in the following.

BRIEF DESCRIPTION OF THE DRAWINGS

Illustrative embodiments of the invention will now be described with reference to the drawings, in which like elements and parts are referred to by the same reference numbers, and in which.

DETAILED DESCRIPTION OF THE PREFERRED EMBODIMENTS

Figure 1:
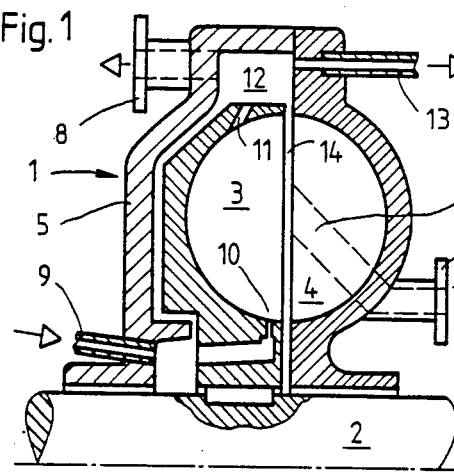
FIGS. 1 to 3 are cross-sectional views showing retarders according to respective embodiments of the invention, each having a particular inventive arrangement of inlet and outlet channels for a blocking medium.

FIG. 1 shows a retarder 1, driven by a shaft 2, on which a bladed rotor wheel 3 is fastened. The rotor wheel 3 is opposite a bladed stator wheel 4, which in turn is secured against rotation in a housing 5. An opening 6 is provided for the entry of the working medium, which upon braking enters the working chamber through a channel 7 and leaves the retarder again through an outlet opening 8. Further details of the principal circuit for the supply of the working medium to the retarder in the braking operation have been left out of the Figures for clarity.

A secondary circuit is formed for the supply of blocking medium to the retarder during non-braking intervals. For this purpose there is located in a radially internal area of the housing 5 an inlet channel 9 for the blocking medium. The latter enters the working chamber formed by the bladed wheels 3 and 4 through a nozzle 10. This nozzle 10 can be directed radially inward or outward at bladed rotor wheel 3 so that the jet is directed into the working chamber radially outward or inward. Through the rotation of the bladed wheel 3 the blocking medium forms a film in the area of the gap 14 between the bladed wheels and leaves the working chamber through a bore 11 in the outer area of the working chamber and passes into a receiver 12, in which an outlet channel 13 terminates. From the outlet channel 13 the blocking medium is again led, after suitable preparation and cooling, to inlet channel 9. The direction of flow of blocking medium is shown with arrows in FIG. 1, as well as in the following Figures. Means for maintaining the secondary circuit, for example a circulation pump and cooling unit, are not shown in FIGS. 1-4.

Figure 2:
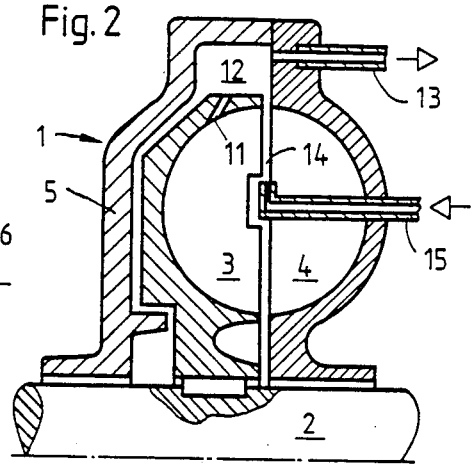

In FIG. 2 is shown a retarder which, unlike the embodiment of FIG. 1, has an inlet channel for the blocking medium leading into the center of the working chamber. At the end of inlet channel 15 is arranged a nozzle which delivers a jet of blocking medium directed radially outward straight into gap 14 between the bladed wheels. The blocking medium leaves the working chamber as in the design according to FIG. 1 through bore 11, receiver 12, and outlet channel 13.

Figure 3:
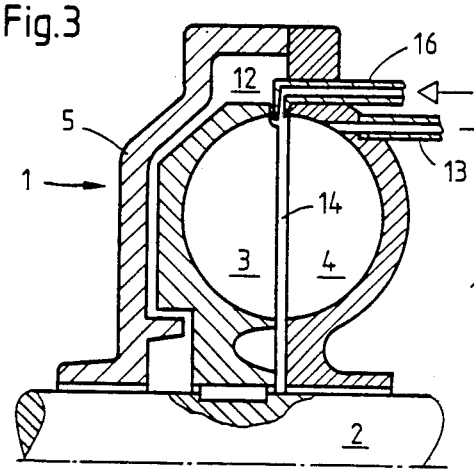

In FIG. 3 is shown a retarder in which the blocking medium is introduced straight into gap 14 between the bladed wheels through a nozzle pointing radially inward from an inlet channel 16. In this version a particularly dense blocking film is formed in the radially external area of gap 14. The inventors have recognized that it is, above all, in the external area of the working chamber, that undesired air flow is responsible for the occurrence of losses. This embodiment, therefore, is particularly advantageous. Through an outlet channel 13, which is fitted in the radially external area of the bladed fixed wheel 4, the blocking medium leaves the working chamber.

Figure 4:
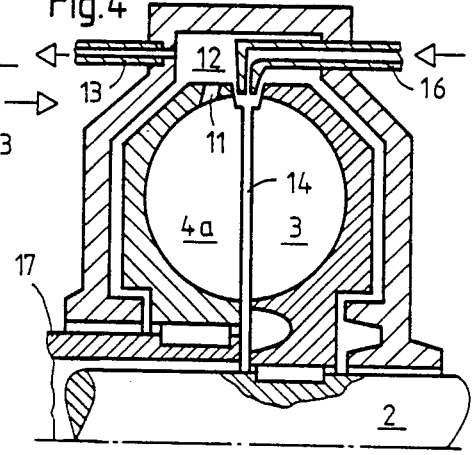
FIG. 4 in a cross-sectional view showing a retarder according to another embodiment of the invention, including bladed wheels rotating in opposite directions.

FIG. 4 shows a retarder having two rotary bladed wheels, i.e., a first bladed wheel 3, which is fastened to a drive shaft 2, and a second bladed wheel 4a, which is fastened to a second shaft 17 and which rotates in the direction opposite to that of bladed wheel 3. The counter-rotation can be induced by a reversing gear unit between drive shaft 2 and shaft 17 (not shown). With this version, also called a counter-rotating retarder, again the injection of the blocking medium, for example into the external area of the working chamber as in FIG. 3, is preferably effected radially from the outside into gap 14. The blocking medium leaves the working chamber again through a bore 11 into a receiver 12 of the housing 5, which encloses both bladed wheels 3, 4a.

Figure 5:
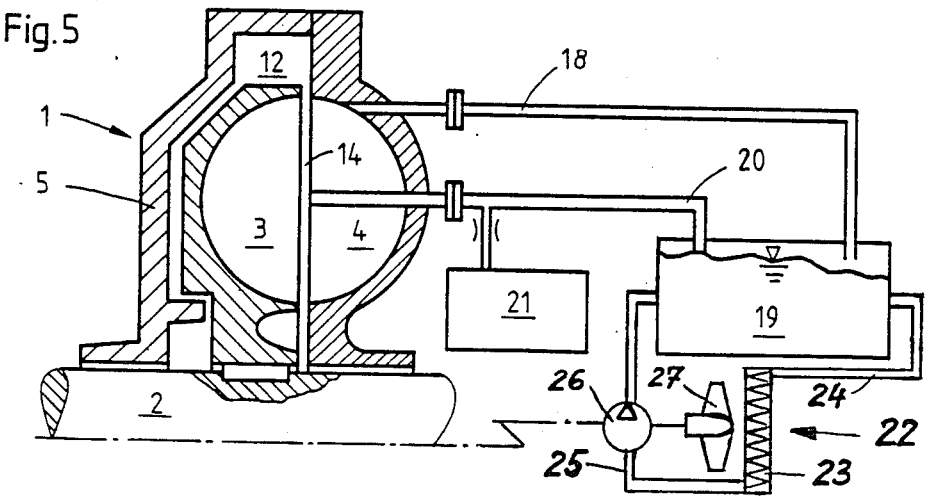
FIG. 5 is a cross-sectional view showing an example of a retarder according to a further embodiment of the invention, including combined principal and secondary circuits for the blocking medium.

Another embodiment of a retarder is shown in FIG. 5. In this, a main circuit for the working medium circulating during braking operation is combined with a secondary circuit for the blocking medium. During intervals of no braking the same piping and inlet and outlet channels are used for the blocking medium as for the filling of the retarder for braking. Additional elements employed in the braking operation have been left out for clarity. Used as blocking medium in this example is a mixture of air and working fluid. An outlet channel 18 and an inlet channel 20 are connected to a tank 19. This tank may, for example, be a heat exchanger. Outlet channel 18 is arranged in the outer area of the working chamber so that the blocking medium is flung out by the inherent energy due to rotation and propelled into tank 19. This subjects the interior of tank 19 to pressure so that a secondary circuit flow is created by inlet channel 20. The tank-side end of inlet channel 20 is arranged so that, upon the inflow of air, a certain quantity of fluid is simultaneously entrained in the inlet channel 20. The entry of the blocking medium into the working chamber and into the gap 14 between the bladed wheels again takes place in the vicinity of the center. A tank 21 takes up excess blocking medium. An example of a main circuit for supply of working medium to the retarder is disclosed in DE-AS 22 38 726, which is equivalent to U.K. Pat. No. 1,380,847.

Also illustrated is a cooling system 22 for cooling the operating liquid. It comprises a coil 23 which communicates with the heat exchanger 19 through a conduit 24, and communicates with a pump 26 through a conduit 25. The pump 26 in turn pumps fluid into the heat exchanger 19. A fan 27 blows air across the coil. Both the pump 26 and the fan 27 are shown connected to the drive shaft 2 in FIG. 5. Alternatively, they may be driven by separate drive means.

Although illustrative embodiments of the invention have been disclosed herein, the invention is not limited to such embodiments. Rather, modifications and variations thereof may occur to one of ordinary skill in the art within the spirit and scope of the invention, as defined in the claims.

What is claimed is:

1. A hydrodynamic retarder comprising:
    at least two wheels fitted with blades, which together form a toroidal working chamber,
    a main fluid circuit for filling the working chamber at least partially with a working medium in an ON condition and substantially emptying the working medium from the working chamber in an OFF condition, and
    means for reducing air circulation in the working chamber in the OFF condition, including secondary fluid circuit means for introducing a small quantity, in comparison with the volume of the working chamber, of a flowable blocking medium, into the working chamber, for causing reduction of the air circulation between the bladed wheels;
    wherein said secondary circuit means comprises a supply channel for the blocking medium having nozzle means for introducing a jet of the blocking medium into the working chamber.

2. A hydrodynamic retarder according to claim 1, wherein air is used as the blocking medium.

3. A hydrodynamic retarder according to claim 1, wherein the blocking medium consists essentially of a mixture of the same fluid working medium employed in the ON condition, with the addition of air.

4. A hydrodynamic retarder according to claim 1, wherein the nozzle means is in a radially internal area of the working chamber.

5. A hydrodynamic retarder according to claim 1, wherein the nozzle means is in a radially external area of the working chamber.

6. A hydrodynamic retarder according to claim 1, wherein the nozzle means of the supply channel for the blocking medium includes at least one nozzle.

7. A hydrodynamic retarder according to claim 6, wherein the nozzle means of the supply channel for the blocking medium is adjacent to one of the bladed wheels.

8. A hydrodynamic retarder according to claim 6, wherein the nozzle means of the supply channel for the blocking medium is adjacent to a portion of the retarder (4, 5) that is secured against rotation.

9. A hydrodynamic retarder according to claim 6, wherein the nozzle means of the supply channel for the blocking medium is arranged adjacent to a nonrotating bladed wheel.

10. A hydrodynamic retarder according to claim 6, wherein the nozzle means of the supply channel for the blocking medium is arranged in the interior of the working chamber near the center of the working chamber.

11. A hydrodynamic retarder according to claim 1, wherein the jet of blocking medium is directed generally radially outward with respect to the working chamber.

12. A hydrodynamic retarder according to claim 1, wherein the jet of blocking medium is directed generally radially inward with respect to the working chamber.

13. A hydrodynamic retarder according to claim 1, wherein the jet of the blocking medium is directed into a gap between the bladed wheels.

14. A hydrodynamic retarder according to claim 1, wherein the bladed wheels are enclosed, in a radially external area thereof, by an annular channel for accommodation of the blocking medium.

15. A hydrodynamic retarder according to claim 14, wherein at least one of the bladed wheels is associated with at least one opening in a radially external area thereof, for discharge of the blocking medium out of the working chamber.

16. A hydrodynamic retarder according to claim 1, wherein the secondary circuit includes the working chamber as well as circulating means for forcing circulation of the blocking medium, the circulating means including a cooling unit.

17. A hydrodynamic retarder according to claim 1, wherein the secondary circuit includes circulating means for the circulation of the blocking medium, the circulating means including the bladed wheels in the working chamber, and a blocking medium tank for introducing the blocking medium into the secondary circuit.

18. A hydrodynamic retarder according to claim 17, wherein the blocking medium also circulates through the working chamber in the ON condition.

19. A hydrodynamic retarder according to claim 1, wherein the bladed wheels rotate in opposite directions and at least one of the bladed wheels has at least one opening passage for blocking medium.

20. A hydrodynamic retarder according to claim 7, further comprising a drive shaft which rotates with said one of the bladed wheels.

* * * * *